(12) United States Patent
Mayer

(10) Patent No.: US 7,257,963 B2
(45) Date of Patent: Aug. 21, 2007

(54) THERMAL INSERT FOR CONTAINER HAVING A PASSIVE CONTROLLED TEMPERATURE INTERIOR

(75) Inventor: William Mayer, White Bear Lake, MN (US)

(73) Assignee: Minnesota Thermal Science, LLC, Plymouth, MN (US)

( * ) Notice: Subject to any disclaimer, the term of this patent is extended or adjusted under 35 U.S.C. 154(b) by 703 days.

(21) Appl. No.: 10/440,859

(22) Filed: May 19, 2003

(65) Prior Publication Data
US 2004/0231355 A1 Nov. 25, 2004

(51) Int. Cl.
*F25D 3/08* (2006.01)
(52) U.S. Cl. ............... 62/371; 62/530; 62/457.1
(58) Field of Classification Search ............ 62/371, 62/372, 457.1, 529, 530
See application file for complete search history.

(56) References Cited

U.S. PATENT DOCUMENTS

| | | | |
|---|---|---|---|
| 2,496,296 A | 2/1950 | Frederick | |
| 3,974,658 A | 8/1976 | Starrett | |
| 4,145,895 A * | 3/1979 | Hjertstrand et al. | 62/529 |
| 4,319,629 A | 3/1982 | Hotta | |
| 4,324,111 A | 4/1982 | Edwards | |
| 4,688,398 A | 8/1987 | Baek | |
| 4,877,128 A | 10/1989 | Strickland | |
| 4,892,226 A | 1/1990 | Abtahi | |
| 4,923,077 A | 5/1990 | Van Iperen | |
| 4,931,333 A | 6/1990 | Henry | |
| 5,050,387 A | 9/1991 | Bruce | |
| 5,088,301 A * | 2/1992 | Piepenbrink | 62/457.6 |
| 5,435,142 A | 7/1995 | Silber | |
| 5,562,228 A | 10/1996 | Ericson | |
| 5,582,343 A | 12/1996 | Dalvey | |
| 5,758,513 A | 6/1998 | Smith | |
| 5,899,088 A * | 5/1999 | Purdum | 62/371 |
| 5,924,302 A | 7/1999 | Derifield | |
| 6,209,343 B1* | 4/2001 | Owen | 62/457.2 |
| 6,223,551 B1 | 5/2001 | Mitchell | |
| 6,233,965 B1* | 5/2001 | Choy | 62/371 |
| 6,250,104 B1 | 6/2001 | Bostio | |
| 6,266,972 B1* | 7/2001 | Bostic | 62/371 |
| 6,467,323 B1 | 10/2002 | Narushima et al. | |
| 6,474,095 B1 | 11/2002 | Chan | |
| 6,502,417 B2 | 1/2003 | Gano, III | |
| 6,718,776 B2 | 4/2004 | Wessling et al. | |
| 2002/0050147 A1 | 5/2002 | Mal et al. | |

* cited by examiner

*Primary Examiner*—William C Doerrler
(74) *Attorney, Agent, or Firm*—Sherrill Law Offices, PLLC

(57) ABSTRACT

An apparatus for shipping articles under controlled temperature conditions, having alternating enclosure walls for providing temperature insulation and for providing alternating reservoirs of phase change materials, wherein the respective phase change materials are different in each alternating reservoir. The innermost reservoirs comprise a thermal insert which modifies the control temperature inside the container.

18 Claims, 2 Drawing Sheets

THERMAL INSERT FOR CONTAINER HAVING A PASSIVE CONTROLLED TEMPERATURE INTERIOR

BACKGROUND OF THE INVENTION

This is related to my prior filed application, entitled 'Container Having Passive Controlled Temperature Interior, and Method of Construction,' Ser. No. 10/278,662, filed Oct. 23, 2002, and my prior filed application, entitled 'Container Having Passive Controlled Temperature Interior,' Ser. No. 10/411,847, filed Apr. 11, 2003.

The shipment of temperature-sensitive goods is extremely difficult when the shipping container itself is not independently temperature-controlled; ie, does not have an independent power source for maintaining interior temperatures within close parameters. Of course, if it is merely desired to maintain an object to be shipped at a nominally cooled temperature—relative to the ambient exterior temperature—a common practice is to pack a shipping container with ice, and hope that the ice will remain in a frozen state during transit so that the object shipped will arrive at its destination still cooled below ambient temperature. This can be an adequate technique for shipping objects where temperature control is not critical. However, even in this case, the temperatures at different points inside the shipping container will vary widely, with parts of the interior of the container becoming quite cool and other parts of the interior warming to various degrees, depending on time and the distance and spatial relationship of the shipped object to the cooling ice which remains in the container.

In shipping objects for which the ambient temperature is expected to be cooler than the desired temperature for the object, the common practice is to place the warmed object inside a container having insulated walls, and then to hope the shipping time is shorter than the time for the heat inside the container to escape through the insulated walls.

The present invention, and my prior-filed applications, cover inventions which utilize three important principles to construct a new and novel construction, and method of using, to provide improved temperature controls inside shipping containers. First, a characteristic of any phase change material, ie., a material capable of converting from a solid to a liquid, or vice versa, is that during the conversion process the material maintains a constant temperature, referred to as the "melting point;" until the entire volume of the material has been converted to the other state.

Second, a given volume of phase change material requires a certain cumulative transfer of heat, either into the material or out of the material, known as the "heat of fusion," usually measured in Btus/lb. (British thermal units per pound by weight).

Third, the rate at which Btus can be absorbed into the material or transferred outside the material determines the total time that a conversion process requires, ie., the total time that the temperature of the material, and the container in which it is contained, will remain constant at the melting point. This total time can be controlled by enclosing the material and its container in an insulated enclosure which limits the heat transfer rate to a desired quantity.

Different phase change materials may have different melting points and different heats of fusion, so that it is possible to construct a container having an internal constant melting point temperature at 0°, or at some other control temperature which may be desired. For example, water has a melting point of 0° C. and a heat of fusion of 144 Btus/lb, deuterium oxide (heavy water) has a melting point of 4° C. and a heat of fusion of 136 Btus/lb. Many commercially-available phase change materials have melting points over a wider range than water, but have heats of fusion ranging around 70/Btus/lb. This means that greater or lesser volumes of a phase change material may be required, depending upon the desired melting point temperature. Another factor of concern is material cost; the cost of deuterium oxide is about $200/lb., while the cost of many commercially-available materials is only several dollars per pound. Finally, yet another factor is shipping cost, where the size and weight of the container can greatly affect the cost to ship products.

My prior filed patent applications disclose several alternative constructions for containers having passive, reliable and relatively inexpensive structures for protecting highly temperature-sensitive products and materials during shipment and short-term storage. Such products and materials are usually fairly high in value and may be extremely temperature-sensitive. Some examples of such products or materials are blood shipped or carried to remote battle zones, sensitive pharmaceuticals shipped between plants or to distributors, HIV vaccines shipped to third world countries, and medical instruments shipped to, or kept in readiness at, remote stations or in emergency vehicles. In such cases the ambient temperatures may vary widely, from extremely hot shipping facilities in the southern states to receiving points in cold, mountainous regions of the world in midwinter.

SUMMARY OF THE INVENTION

The present invention comprises an insert for use in conjunction with the constructions described in my prior filed applications, particularly for controlling temperature in ranges outside the normal range of temperatures associated with the melting point and freezing point of a phase change material such as water and/or ice. The insert has at least a partially hollow interior which is fillable with a phase change material operable outside the water/ice phase change temperatures. The insert is packed into the same container as a water/ice phase change material, with the article to be shipped or stored being placed in the container volume interior to the insert.

It is a principal object of the invention to provide a shipping container having an extremely closely-controlled interior temperature throughout the interior volume, and which requires a minimum hollow wall insert for reducing the volume required for the second phase change material.

It is a further object of the invention to provide a thermal insert for a shipping container, which allows the inside control temperature to be shifted from the melting point of the bulk of the container phase change material.

It is a further object of the invention to provide a thermal insert having a relatively small volume of a phase change material different from the main phase change matrial, to reduce overall cost, weight and volume requirements of the container.

Finally, it is an object of the invention to provide a thermal insert which may be used in conjunction with a variety of container constructions and a variety of other phase change materials.

DESCRIPTION OF THE PREFERRED EMBODIMENT

Figure 1:
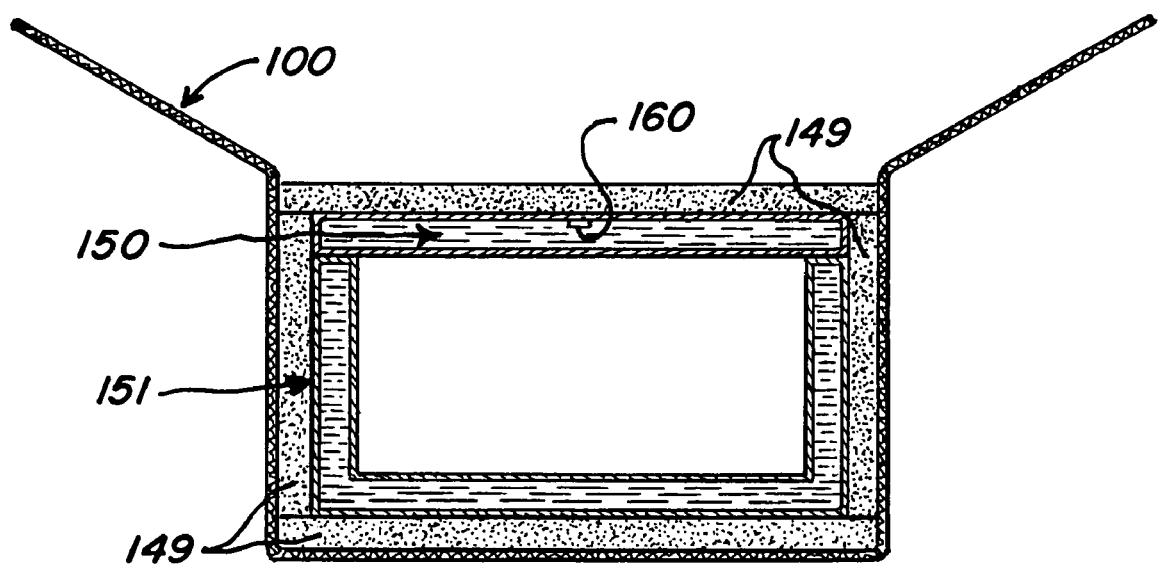
FIG. 1 shows a side cross section view of one form of construction disclosed in my co-pending application.

FIG. 1 shows a cross-section view of one form of shipping container disclosed in my co-pending application. An outer carton 100 may be made from corrugated cardboard or similar material. A plurality of insulated panels 149 line the interior walls of carton 100, wherein these panels may be made from styrofoam plastic material or some similar material having a relatively high thermal resistance.

A plurality of hollow panels or chambers 151 are positioned inside the insulated panels 149. These hollow panels may be formed of a single hollow housing having a sealed bottom and side walls, and a top hollow panel 150, or they may be formed of sealed hollow side panels 151 positioned adjacent a sealed hollow top panel 150 sized to fit over the side panels. If the structure is not rectangular or box-shaped, the walls and panels obviously must be shaped to conform to the shape of the structural walls. A phase change material (PCM), such as liquid water or ice, is filled into the hollow panels, leaving a small volume for expansion inside.

For each separate hollow panel 150, 151, it is important to provide a vent relief hole 160 into the panel, which may be done by providing a hole of approximately ¼ inch covered with a material such as TYVEK® which is a material which passes air but is impervious to water or other similar liquids. TYVEK is a registered trademark of EI Dupont Nemours Co.

The interior walls of the hollow panels or chambers, or at least some of the interior walls, are preferably coated with a material such as aluminum oxide, in the case of using water as the PCM, so as to promote the formation of ice crystals at the freezing point. A material such as aluminum oxide has an irregular, crystalline surface which promotes crystal formation in a liquid such as water. In general, the interior side walls should be at least partially coated with a non-soluble crystalline material which will promote the formation of crystals in the phase change material; ie., aluminum oxide for water and ice. The non-soluble crystalline material should be coated on at least the side walls in the vicinity of the top surface of the liquid, so that when the freezing point is reached the formation of ice crystals readily occurs at the freezing point and where the liquid is at its coldest level.

With the foregoing structure, thermal flux enters the carton through the corrugated outside walls, and is attenuated through the insulated interior panels. It is presumed that the PCM filling the interior hollow panels or chambers is initially converted to a solid such as ice. The thermal flux engages the PCM and causes a gradual phase change of the solid into a liquid at the melting point of the solid. All volumes inside the hollow chambers filled with PCM remain at the melting point temperature of the solid contained within the hollow chambers; therefore, the article being shipped and all regions on the inside of the package remain at the melting point temperature of the PCM. In the case of water/ice, the melting point temperature is approximately 0° C., and therefore the interior temperature will remain at 0° C. for so long as it takes for all the ice to convert to water (144 Btus per pound). The length of time required for this to occur can be controlled by proper selection of the type and thickness of insulation lining the interior container walls, as well as the amount of PCM in the container.

There are alternative constructions which are disclosed in my second co-pending application which are equally effective, and reference to both co-pending applications is suggested.

Figure 2:
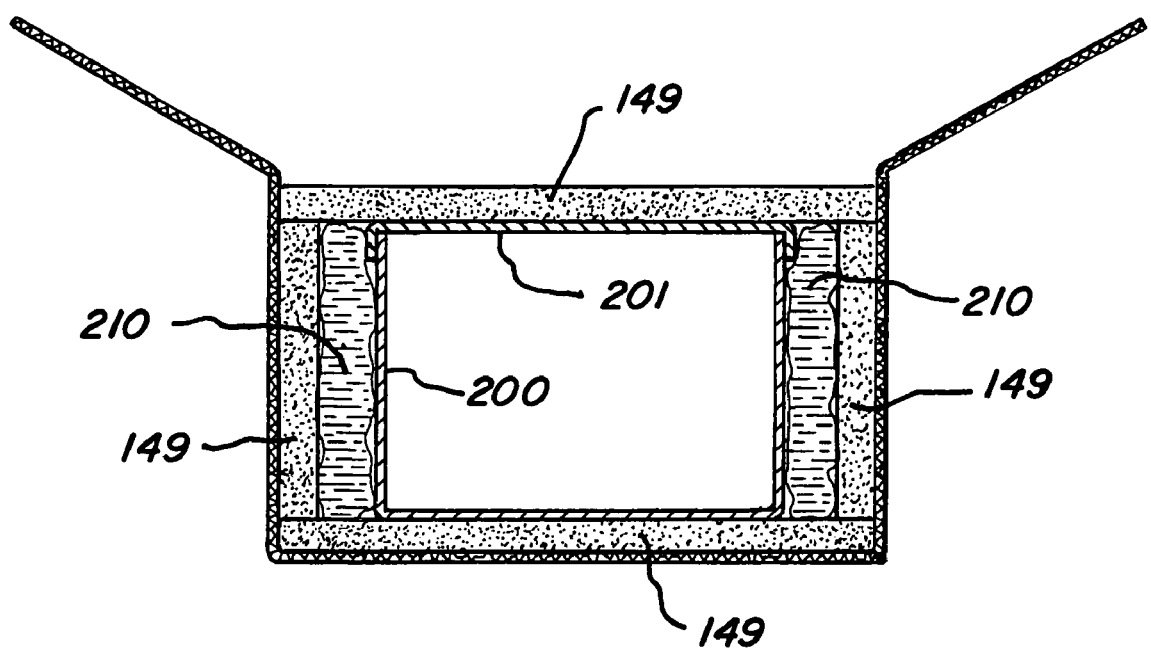
FIG. 2 shows a side cross section view of a second form of construction disclosed in my second co-pending application.

An alternative construction is shown in FIG. 2, which is a container having a rectangular, single-walled structure 200, with a top cover 201, placed inside the insulated outside walls 149. The material of the single-walled structure 200 and the top cover 201 has a high thermal conductance, and is preferably made from a heat-conductive metal such as copper or aluminum. The internal structure 200 is sized to provide a volumetric space between it and at least some of the outside insulated walls 149, and this volumetric space is filled with flexible containers 210, such as plastic bags, filled at least partially with a PCM material such as water and/or ice. The volumetric space may be created between any one or more of the metal single walled container walls, or between the metal cover, or between the metal container bottom surface, and any one or more of the insulated outside walls. However, at least one metal container surface must be in contact with the PCM package. In this case, the heat of fusion is transferred to and from the interior of the single-walled structure 200 uniformly because of the high heat conductance of the construction materials of the metal walls of structure 200.

The embodiment of either FIG. 1 or FIG. 2 is particularly useful when the heat of fusion of the internal volume contents is desirably the same as for a mixture of water and ice, for the structure provides a very economical solution to the problem of maintaining interior temperature for a considerable length of time. The embodiments are very easy to construct at modest cost, and it is not necessary for all interior walls of the insulating panels and exterior walls of the metal container to be separated by a volume of PCM-containing material; it is sufficient if only several walls be so constructed, to achieve the degree of temperature stabilization desired in any particular application.

The foregoing alternative embodiments can present a cost problem when the PCM material is selected to be something other than water and/or ice, which is the case if the desired controlled temperature is outside the normal range of heating/cooling of water and/or ice. In particular, the problem is compounded when the duration of controlling the temperature is increased, for then the interior volume for containing the PCM material must be correspondingly increased. If this volume is necessarily increased, and the selected PCM material is costly by volume, the overall cost and/or size of the required shipping container may exceed the benefit desired, leading to the selection of a different approach, usually requiring an active power source, in substitution of the structures disclosed herein.

Figure 3:
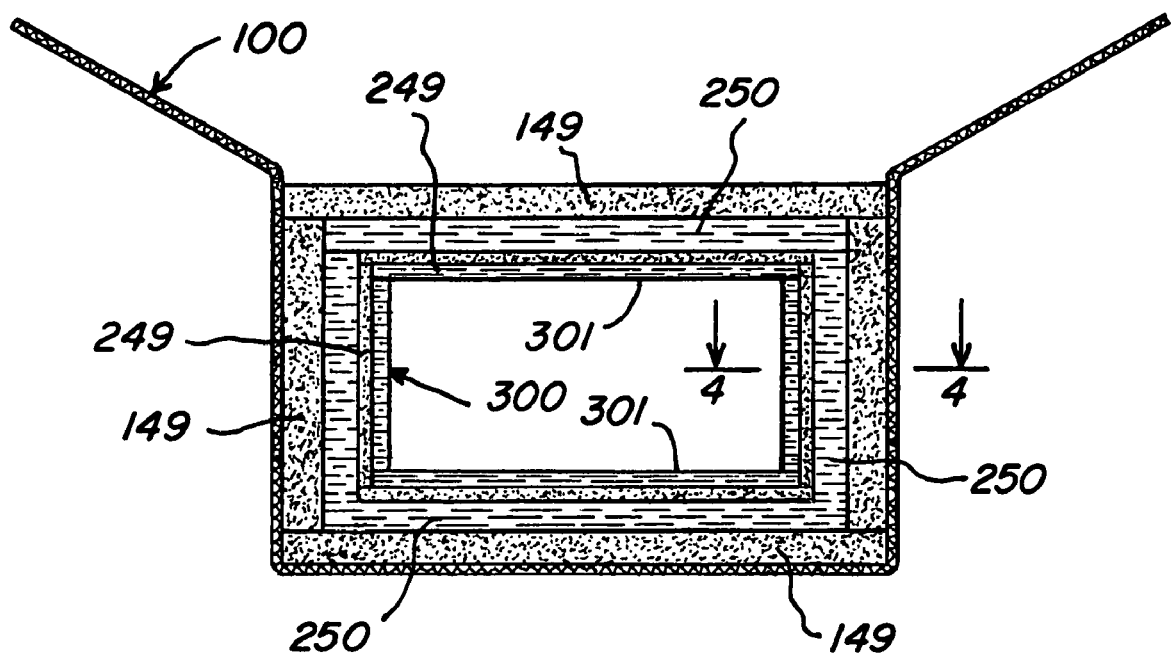
FIG. 3 shows a side cross section view of the the present invention utilizing two phase change material chambers.

FIG. 3 shows a construction utilizing the thermal insert of present invention, which greatly reduces the volume requirements required for expensive PCM materials. An outside container 100 such as corrugated cardboard or the like is sufficiently strong to contain the intended shipping materials. A series of insulated panels 149, made from styrofoam or like material, line the inside walls of container 100. A plurality of hollow PCM chambers 250 are seated inside the insulated panels 149, each chamber sized to sealably contain a volume of a PCM such as water/ice, with each chamber having a vent as described earlier. A second series of insulated panels 249 is positioned adjacent the interior walls of the chambers 250, and each of these panels is constructed of an insulating material such as styrofoam. Finally, a thermal insert 300 comprising a hollow chamber or group of chambers 301 is positioned inside the insulation panels 249. The respective volumes of chambers 301 are significantly smaller than the volumes of outer chambers 250, and therefore require a much smaller volume of PCM material for filling.

Figure 4:
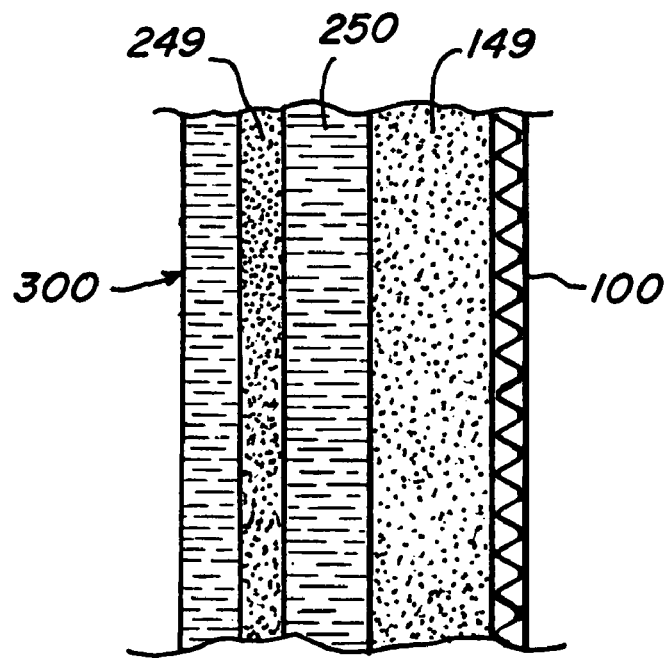
FIG. 4 shows a cross sectional view taken along the lines 4-4 of FIG. 3.

FIG. 4 shows an exploded view of a partial cross section taken along the lines 4-4 of FIG. 3. The outside corrugated cardboard or the like 100 forms the structural support for the container. The next interior layer 149 consists of a material having high thermal resistance, such as styrofoam plastic, and this material forms a thermal barrier between the outside temperature and the inner contents. The next inner section comprises a chamber or series of chambers 250 for holding a PCM material, preferably water and/or water and ice having a heat of fusion of 144 Btus/pound of PCM material, and which holds the interior temperature at 0° C. for so long as it takes to melt and/or freeze the water/ice mixture. The next interior section comprises a further set of insulated panels 249 made from a highly thermal resistive material as before, and the final interior section comprises a thermal insert 300 having one or more hollow chambers 301 filled with a different PCM material, such as deteurium oxide ($D_2O$) which has a heat of fusion of about 136 Btus/pound and a melting point of 4° C.

In operation, the temperature change between the outside of the corrugated container and the inner walls of the first PCM chamber 250 will be sufficient to hold the inner wall temperature of the first PCM chamber at 0° C. for so long as the volume of PCM material absorbs or gives off heat. The temperature change between the inner walls of the first PCM chamber 250 and the interior of the innermost PCM chamber 300 will only be about 4° C., which is the melting point of the PCM deteurium oxide. The articles shipped inside the container will therefore be held at 4° C. for the length of time the two PCM chambers are operative under the conditions of the environment in shipping, which normally will be at least 72 hours or such other time as the PCM material volumes have been designed. Furthermore, the volume of the inner PCM chamber can be greatly reduced because the chamber must deal with a temperature gradient of only several degrees, and therefore the overall volume of the container can be made smaller than would otherwise be required. In a typical case, the inner chamber 300 may only be required to absorb 50-60 Btus over a 72-hour shipping interval.

In one example, it was required to maintain the temperature of the articles inside the container at 36° F. for 72 hours. The size of the interior container volume was 5.5"×5"×5.5". The thermal insulating walls were 1" thick and had a thermal resistance of R=30. The outer PCM chamber 250 was filled with water to a volume weight of 3.7 pounds, and the interior PCM chamber was filled with $D_2O$ to a volume weight of 0.8 pounds. This construction was sufficient to hold the inside container temperature to 36° F. for over 72 hours. The cost of the $D_2O$ was about $100.00; if the construction had used only a single PCM chamber, as shown in FIGS. 1 and 2, the volume of $D_2O$ required would be over 4 pounds, at a cost of over $800.00. If a commercially-available phase change material were used, selected for the desired melting point, the overall container size would be double the above example, and the container weight would also double.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. An apparatus defining a retention chamber and having sequential layers of (i) an inner phase change material having a melting point, (ii) a first layer of thermal insulation, (iii) an outer phase change material having a melting point which is different from the melting point of the inner phase change material, and (iv) a second layer of thermal insulation, wherein the retention chamber is fully encompassed by the inner phase change material.

2. An apparatus, comprising:
   (a) a first enclosure defining a retention chamber and containing a first phase change material having a melting point which completely encompasses the retention chamber,
   (b) a first insulating layer completely encompassing the first enclosure,
   (c) a second enclosure containing a second phase change material having a melting point which is different from the melting point of the first phase change material, wherein the second phase change material completely encompasses the first insulating layer, and
   (d) a second insulating layer completely encompassing the second enclosure.

3. The apparatus of claim 1 wherein the apparatus has a lid.

4. The apparatus of claim 2 wherein the apparatus has a lid.

5. The apparatus of claim 1 wherein the inner phase change material contains $D_2O$.

6. The apparatus of claim 2 wherein the first phase change material contains $D_2O$.

7. The apparatus of claim 1 wherein the inner phase change material is $D_2O$.

8. The apparatus of claim 2 wherein the first phase change material is $D_2O$.

9. The apparatus of claim 1 wherein the outer phase change material contains $H_2O$.

10. The apparatus of claim 2 wherein the second phase change material contains $H_2O$.

11. The apparatus of claim 1 wherein the outer phase change material is $H_2O$.

12. The apparatus of claim 2 wherein the second phase change material is $H_2O$.

13. The apparatus of claim 1 wherein the difference between the melting point of the inner phase change material and the melting point of the outer phase change material is several degrees Celsius.

14. The apparatus of claim 2 wherein the difference between the melting point of the first phase change material and the melting point of the second phase change material is several degrees Celsius.

15. The apparatus of claim 1 further comprising an outermost shell.

16. The apparatus of claim 2 further comprising an outermost shell.

17. The apparatus of claim 1 wherein the apparatus is a rectangular box.

18. The apparatus of claim 2 wherein the apparatus is a rectangular box.

* * * * *